United States Patent [19]

Ozawa et al.

[11] Patent Number: 5,077,108
[45] Date of Patent: Dec. 31, 1991

[54] RUBBER-FIBER LAMINATE AND HOSE USING THE SAME

[75] Inventors: Osamu Ozawa, Hiratsuka; Shuji Takahashi, Chigasaki; Shigeru Igarashi, Hiratsuka, all of Japan

[73] Assignee: The Yokohama Rubber Co., Ltd., Japan

[21] Appl. No.: 434,247

[22] Filed: Nov. 13, 1989

[30] Foreign Application Priority Data

Nov. 14, 1988 [JP] Japan .................. 63-287423

[51] Int. Cl.$^5$ .................. F16L 11/04; B32B 1/08
[52] U.S. Cl. .................. 428/362; 428/368; 428/521; 428/523; 428/284; 428/286; 428/287
[58] Field of Search ............ 428/36.2, 36.8, 521, 428/523, 284, 286, 287; 138/126

[56] References Cited

U.S. PATENT DOCUMENTS

| | | | |
|---|---|---|---|
| 3,991,027 | 11/1976 | van Gils et al. | 260/29.3 |
| 4,314,006 | 2/1982 | Lentz et al. | 428/494 |
| 4,315,966 | 2/1982 | Akiyama et al. | 428/260 |
| 4,359,506 | 11/1982 | Wiggins et al. | 428/412 |
| 4,399,853 | 8/1983 | Morimoto et al. | 152/359 |
| 4,694,067 | 9/1987 | Maeda et al. | 528/393 |

*Primary Examiner*—James J. Seidleck
*Assistant Examiner*—Charles R. Nold
*Attorney, Agent, or Firm*—Finnegan, Henderson, Farabow, Garrett & Dunner

[57] ABSTRACT

Composite laminates are disclosed which are designed to exhibit superior resistance to oil and to heat and which are comprised essentially of a rubbery layer and a fibrous layer bonded thereover. The rubber layer is formed from a rubber composition made up of highly hydrogenated acrylonitrile-butadiene rubber, an organic peroxide curing agent and magnesium oxide, and the fibrous layer is formed from an organic fiber treated with a dip coating of a specified composition. Also disclosed is a composite hose in which the rubbery layer is utilized as an inner tube and the fibrous layer as a reinforcement.

14 Claims, 2 Drawing Sheets

RUBBER-FIBER LAMINATE AND HOSE USING THE SAME

BACKGROUND OF THE INVENTION

1. Field of the Invention

This invention is directed to composite laminates comprised of a rubbery layer formed from a rubber composition of a selected acrylonitrile copolymer and a fibrous layer formed from a selected organic fiber treated with a specified dip coating, both layers being bonded together into an integral structure. The invention further relates to composite hoses having such rubbery and fibrous layers assembled as constituent parts.

2. Description of Prior Art

Rubber products such as hoses, tires, belts, rolls, shapes and the like have of late found application under oil-stained, elevated temperature and pressure conditions for prolonged periods of time. Fast deterioration of such product literally needs laborious maintenance and replacement and will in some instances lead to serious hazards.

A variety of rubbers are know to be resistant to oil and to heat at from 120° to 150° C. They include acrylonitrile-butadiene rubber (NBR), acryl rubber (ACM), ethylene-acryl rubber (AEM), ethylene-acryl-vinyl acetate rubber (ER), chlorosulfonated polyethylene rubber (CSM), chlorinated polyethylene rubber (CM) and the like and also modified NBR rubbers having their conjugated diene units hydrogenated. To cope with the trend of the users' stricter requirements in regard to heat resistance even at about 170° C., certain acrylonitrile copolymers have been proposed in which the conjugated diene units are hydrogenated at a greater level.

In general, rubber compositions are broadly classifiable into two modes of vulcanization, one of which is sensitive to sulfur and the other to organic peroxide. Peroxide vulcanization is preferred to attain improved heat resistance. From the adhesion point of view, sulfur vulcanization is commonly accepted as many rubber products are usually built of rubber and fiber.

Highly hydrogenated acrylonitrile copolymers are necessarily subjected to peroxide vulcanization. This leaves the problem that such specific rubbers will not sufficiently bond to fibrous material, resulting in a composite laminate of poor structural strength. There has been still much to be desired in making the fullest use of the beneficial effects of those rubbers.

SUMMARY OF THE INVENTION

It has now been found that composite laminates of superior adhesion characteristics can be obtained by the use of acrylonitrile copolymers of high hydrogenation degrees combined with an organic fiber treated with a specific dip coating.

The present invention therefore seeks to provide a composite laminate which comprises a rubbery layer of a selected rubber composition and a fibrous layer of a selected organic fiber integrally bonded thereover and which exhibits enhanced resistance to oil and heat. Further, the invention seeks to provide a composite hose having two such layers incorporated respectively as a core and as a reinforcement.

The above and other objects and advantages of the invention will become better understood from the following description taken in conjunction with the accompanying drawings. Like numerals refer to like or corresponding parts throughout the several views.

According to one aspect of the invention there is provided a composite laminate comprising (a) a rubbery layer formed from a rubber composition comprising 100 parts by weight of a copolymeric rubber having in the molecular chain an unsaturated nitrile unit in an amount of 10 to 45 percent by weight, a conjugated diene unit in an amount up to 5 percent by weight and either one or both of an ethylenically unsaturated unit other than the unsaturated nitrile unit and a hydrogenated conjugated diene unit, 0.2 to 15 parts by weight of an organic peroxide curing agent and 1 to 20 parts by weight of magnesium oxide and (b) a fibrous layer formed from an organic fiber disposed adhesively over the rubbery layer, the fiber having previously been treated with a dip coating consisting essentially of 100 parts by weight of at least one latex of acrylonitrile-butadiene rubber and a carboxyl-modified rubber thereof and 30 to 70 parts by weight of a precondensate of resorcinol and formalin in a mol ratio of 5:3 to 1:1.

According to another aspect of the invention there is provided a composite hose comprising (a) an inner tube formed from a rubber composition comprising 100 parts by weight of a copolymeric rubber having in the molecular chain an unsaturated nitrile unit in an amount of 10 to 45 percent by weight, a conjugated diene unit in an amount up to 5 percent by weight and either one or both of an ethylenically unsaturated unit other than the unsaturated nitrile unit and a hydrogenated conjugated diene, 0.2 to 15 parts by weight of an organic peroxide curing agent and 1 to 20 parts by weight of magnesium oxide, (b) a reinforcing layer disposed peripherally over the inner tube and formed from an organic fiber, said fiber having previously been treated with a dip coating consisting essentially of 100 parts by weight of at least one latex of acrylonitrile-butadiene rubber and a carboxyl-modified rubber thereof and 30 to 70 parts by weight of a precondensate of resorcinol and formalin in a mol ratio of 5:3 to 1:1 and (c) a cover laminated around the reinforcing layer.

DETAILED DESCRIPTION OF THE INVENTION

Four rubber compositions contemplated under the invention are those referred to simply as rubbers A to D and described later.

Rubber A comprises at least one copolymeric rubber (a), an organic peroxide curing agent (b) and magnesium oxide (c).

Component (a) is an acrylonitrile copolymer which is highly hydrogenic in nature and notably resistant to oil and to heat. This copolymer is made up of a nitrile unit (ACN), a double carbon linkage unit (—C=C—) and a saturated methylene unit (—C—C—); that is, it is composed of 10 to 45% by weight of an unsaturated nitrile unit, 0 to 5% by weight of a conjugated diene unit and 50 to 90% by weight of an ethylenically unsaurated unit other than the unsaturated nitrile unit or a hydrogenated conjugated diene unit or both.

The nitrile unit (ACN) has the formula and should range in content from 10 to 45%. Smaller contents than 10% would lead to inadequate oil resistance, whereas greater contents than 45% would show a decline in cold resistance.

The carbon-carbon unit (—C=C—) is a conjugated diene unit of the formula and should be in a content of less than 5%. This is interpreted to mean that the majority of the double carbon linkage has been hydrogenated. The carbon-carbon unit if larger than 5% would make the final mix less resistant to elevated temperature at above 120° C. and less proof to degraded oil.

The saturated methylene unit (—C—C—) is a unit represented by the formula and should be in a content of 50 to 90%. More methylene unit than 90%, hence less unsaturated nitrile unit, would develop too low a resistance to oil to warrant commercial application. Less methylene unit than 50%, hence more unsaturated nitrile unit, would fail to improve cold resistance. Methylene unit contents not exceeding 50%, hence decreased nitrile unit and increased carbon-carbon unit, would result in a rubber mix of reduced resistance to elevated temperature at above 120° C. and to degraded oil.

Specific examples of component (a) include hydrogenated rubbers such as of acrylonitrile-butadiene rubber, acrylonitrile-isoprene rubber, acrylonitrile-butadiene-isoprene rubber, acrylonitrile-butadiene-methyl acrylate rubber, acrylonitrile-butadiene-acrylate rubber, acrylonitrile-ethylene-butadiene rubber, acrylonitrile-butyl acrylate-ethoxyethyl acrylate-vinyl chloroacetate rubber, acrylonitrile-butyl acrylate-ethoxyethyl acrylate-vinyl norbornene rubber and the like. These rubbers may be used alone or in combination when it is found necessary.

Organic peroxides useful as component (b) in the invention are not specifically restrictive. Preferred are those having a half life of 10 hours and a decomposition temperature of 80° C. or higher and inducing no excessive crosslinking at a given curing temperature. This component typically includes dialkyl peroxides such as dicumyl peroxide, 1,3-bis(t-butylperoxyisopropyl)benzene, n-butyl 4,4-di-t-butylperoxy valerianic acid and the like. Component (b) should be added in an amount of 0.2 to 15 parts in terms of net peroxide based on 100 parts of component (a). The peroxide if smaller than 0.2 part would not be sufficient to cure component (a) and if greater than 15 parts would leave its residues and thus cause objectionable aging while in curing.

Component (c), magnesium oxide (MgO), has a role to improve adhesion of component (a) to fibrous material. This component should range in amount from 1 to 20 parts and preferably from 2 to 20 parts per 100 parts of component (a). MgO if less than 1 part would not be effective for adhesion and if more than 20 parts would produce no better results.

Rubber A may be incorporated, where desired, with various other additives such as fillers, plasticizers, antioxidants and the like.

Rubber B is a composition predominantly of chlorosulfonated polyethylene rubber (d) of the formula where the contents of Al and S are in the range of 24 to 43% by weight and 1.0 to 1.4% by weight, respectively. Component (d) is reputed for its resistance to weather, ozone and chemicals and further for its heat resistance and flame retardance. This rubber is vulcanized in the presence of a unique curing agent (e) selected from a metal oxide, an organic peroxide or an organic acid. Specific examples include metallic oxides such as magnesium oxide, lead oxide, lead tribasic maleate and the like, resinous acids such as organic peroxides, hydrogenated rosins, abietic acid and the like and organic fatty acids such as stearic acid, lauric acid and the like.

Accelerators (f) in actual use may conveniently be employed to facilitate vulcanization of component (d). In examples of component (f) are included (1) amines such as hexamethylenetetraamine and the like, (2) aldehyde-ammonias such as acetaldehyde-ammonia and the like, (3) aldehydeamines such as reaction products of n-butyl aldehyde and aniline and the like, (4) guanidines such as diphenylguanidine, di-o-tollylguanidine and the like, (5) thiureas such as ethylenethiurea(2-mercaptoimidazoline), diethylthiurea, trimethylthiurea and the like of the formula,

(6) thiazoles such as mercaptobenzothiazole, dibenzothiazyldisulfide, 2-mercaptobenzothiazole and the like typified by benzothiazoles and represented by the formula where X is a hydrogen atom, a metal or an organic group, (7) sulfenamides such as N-cyclohexyl-2-benzothiazole sulfenamide, N-t-butyl-2-benzothiazole sulfenamide, N-oxydiethylene-2-benzothiazole sulfenamide, N,N-diisopropyl-2-benzothiazole sulfenamide and the like typified by N-substituted-2-benzothiazole sulfenamides and represented by the formulae (8) thiurams such as tetramethylthiuram monosulfide, tetramethylthiuram disulfide, tetraethylthiuram disulfide, tetrabutylthiuram disulfide, dipentamethylenethiuram tetrasulfide and the like which are derivatives of a compound derived by reaction of a secondary amine with carbon disulfide and represented by the formula where R and R' each are a hydrogen atom or an alkyl group, the two substituents may be joined to form a ring, and x is an integer of 1, 2 or 4, (9) dithiocarbamates such as zinc dimethyldithiocarbamate, zinc diethyldithiocarbamate, zinc di-n-butyldithiocarbamate and the like which are metal salts or amine compounds derived from dithiocarbamic acid or a reaction product of a secondary amine and carbon disulfide, and represented by the formula where R and R' each are an alkyl group, and X is a metal or an amine, and (10) xythantogenates such as sodium isopropylxythantogenate, zinc butylxythantogenate and the like that are reaction products of alcohols and carbon disulfide. Components (e) and (f) include those compounds of both acidic and basic types. Basic compounds of component (e) may be used singly or combined with two or more.

Rubber B may if necessary be admixed with the same additives as above noted in connection with rubber A.

Rubber C comprises a sulfur-vulcanizable rubber (g), an organic sulfur-containing compound (h), a silica (i), a resorcinol donor (j) and a methylene donor (k).

Component (g) may by suitable choice be taken from natural rubber (NR), polyisoprene rubber (IR), styrene-butadiene rubber (SBR), acrylonitrile-butadiene rubber (NBR) and the like.

Component (h) acts to vulcanize component (g). Suitable compounds of this component may be selected from 6-R-2,4-dimercapto-1,3,5-triazines of the formula where R is a mercapto, alkoxy, mono- or di-alkylamino, mono-or di-cycloalkylamino, mono- or di-arylamino or N-alkyl-N'-arylmino group. Particularly preferred is 2,4,6-trimercapto-1,3,5-triazine.

As component (h) there may also be used sulfur donors commonly accepted in the art. Such donor is a compound capable of separating sulfur as active sulfur during curing and then discharging the same out of the reaction system. Specific examples include (1) thiuram disulfides of the formula where R and R' each are a hydrogen atom or an alkyl group, the two substituents being connectable for ring formation, such as tetramethylthiuram disulfide, tetraethylthiuram disulfide, dipentamethylenethiuram disulfide and the like, (2) thiuram tetrasulfides of the formula where R and R' each are a hydrogen atom or an alkyl group, and the two substituents may be connected together for ring formation, such as dipentamethylene thiuram tetrasulfide and the like and (3) morpholine derivatives such as 4,4'-dithiomorpholine, dimorpholine disulfide, 2-(4-morpholinodithio)benzothiazole and the like.

The amount of component (h) to be added should be in the range of 0.1 to 15 parts and preferably 0.5 to 10 parts per 100 parts of component (g). Amounts if less than 0.1 part would render a given rubber less curable and hence physically vulnerable and if more than 15 parts would lead to insufficient scroching and unstable processability.

Component (i), silica, acts as an adhesion improvers. This component should be added in an amount of 1 to 100 parts and preferably 1 to 50 parts based on 100 parts of component (g). Silica if less than 1 part would not be effective in improving adhesion and if more than 100 parts would make the resulting rubber mix too viscous for practical purposes.

Component (j) is a resorcinol donor also for use in improving adhesion. Typical of the donor are resorcinol, condensates of resorcinol and formalin and the like. The component (j) should range in amount from 0.5 to 20 parts and preferably from 1 to 10 parts per 100 parts of component (g). Departures from this range should be avoided to preclude a decline in bondability.

Component (k) is a methylene donor useful as an adhesion improvers. Preferred are hexamethylenetetraamine and the like. This donor should be added in an amount of 0.1 to 10 parts and preferably 0.5 to 5 parts based on 100 parts of component (g). The methylene donor if less than 0.1 part would fail to give acceptable adhesiveness and if more than 10 parts would lead to inadequate scorching while in curing.

As are in rubbers A and B, rubber C may also be added with other additives such as accelerators, fillers, plasticizers, antioxidants and the like.

Rubber D is a blend of rubbers B and C. The blend ratio is optionally determinable dependent upon the quality requirements of the final product.

Dip coatings used for purposes of the invention may be obtained by the use of an acrylonitrile-butadiene rubber latex (1) and/or a carboxyl-modified acryloni- trile-butadiene rubber latex (m) combined with a precondensate of resorcinol and formalin in a mol ratio of 5:3 to 1:1.

Components (l) and (m) excel in resistance to oil and to solvent and also in bondability.

Component (l) contains an NBR rubber of the formula in which the content of the acrylonitrile unit of may preferably range from 15 to 45%. Contents exceeding 25% are preferred to further improve oil resistance and adhesion capability. The dispersion phase has an average particle size in the range of 0.05 to 0.18 μm.

Component (m) contains a carboxyl-modified NBR rubber of the formula

The dispersion phase has an average particle size of 0.04 to 0.12 μm. Component (m) is superior in chemical and mechanical stability to component (l) and crosslinkable in the absence of sulfur.

Component (n) is used as a resorcinol donor composed of a resorcinol-formalin precondensate. The two constituent compounds should be charged in a mol ratio of 5:3 to 1:1. The mol ratio has been found critical to adhesion to rubber and further to stability of the dip coating with time. To this end the amount of the resorcinol donor should be in the range of 30 to 70 parts and preferably 40 to 60 parts per 100 parts of component (l) and/or component (m). Improved adhesion and stability qualities are dominated by the specified donor range of 30 to 70 parts.

Various other additives may be incorporated in the dip coating according to the invention. They include for example stabilizers, viscosity modifiers, antioxidants and the like.

Organic fibers eligible for the invention are suitable as reinforcements usually in the form of braids. The fiber should be treated with the above specified coating so as to attain enhanced bonding to rubber. Such fibrous material may be selected typically from nylons, polyesters, rayons, cottons, vinylons, aramids and the like.

In accordance with one preferred embodiment of the invention, there are typically provided three different types of composite laminates.

A first laminate essentially comprises a rubbery layer formed from rubber A predominantly of a selected class of highly hydrogenated acrylonitrile-butadiene rubbers and a fibrous layer formed from a selected class of organic fibers and treated with a dip coating according to the invention, the two layers being bonded together into an integral structure. A second laminate is constructed with a layer of rubber A, a layer of rubber B based mainly of chlorosulfonated polyethylene rubber and a fibrous layer interposed therebetween, the fiber reinforcement being formed as is in the first laminate. A third laminate is constituted by superposing three rubbery layers one on another with a similar fibrous layer interlaminarily located, the rubbery layers being composed of a group of rubber A, rubber B and rubber C containing a sulfur-vulcanizable rubber, or a group of rubber A, rubber B and Rubber B, or a group of rubber A, rubber B and rubber D as a blend of rubbers B and C.

The first to third laminates may be vulcanized in conventional manner for instance at 130° to 200° C. with the use of indirect airing, direct steaming or pressing. Curing lengths of time may vary with the curing temperature. It should be noted that firm inter lamination is attributed primarily to rubber-rubber adhesion, dip coating-organic acid hydrogen bonding, fiber strand-dip coating anchorage and rubber-latex covulcanization.

Another preferred embodiment of the invention provides composite hoses embodying the structural features of the foregoing laminates. A first hose has an inner tube formed from rubber A and a reinforcing layer formed from an organic fibrous material dipped according to the invention. A second hose is comprised of an inner tube, a reinforcement, an intermediate layer, another reinforcement and a cover superposed in the order mentioned, the inner tube being built of rubber A and the intermediate layer of rubber C, rubber B or rubber D, the two reinforcements being formed and dipped in a manner described above. In each of the first and second hoses a cover should preferably be built of rubber B for its good physical properties.

The hose of the invention may be produced for instance by core extrusion, fiber dipping, fiber braiding, cover extrusion, vulcanization, mandrel removal and hose finishing. Braiding may usually be effected after drying and heat setting of dipped fiber. Vulcanization may suitably be done for example by the modes of lead wrapping, indirect airing, direct steaming and pressing. Temperature conditions are usually at from 130° to 200° C., and time conditions are not specifically restrictive but rather dependent on the temperature.

The following examples are provided to further illustrate the invention. In all formulations the numerical figures are indicated in part by weight unless otherwise noted.

Different rubber mixes were prepared as shown in Tables 1, 2-1 and 2—2 and milled by a mixing roll at 60° C. for 15 minutes. Into the dip coatings enumerated in Table 3 plain cloth and fibrous material of nylon-66 (1,890 d/1) were dipped respectively at 20° C. for 5 minutes, followed by drying at 120° C. for 2 minutes and by subsequent heat setting for 2 minutes. The coatings were matured overnight prior to use.

GROUP I: EXAMPLES 1-3 AND COMPERATIVE EXAMPLES 1-2

Five rubber mixes shown in Table 4 were formed by a laboratory roll into their respective sheets of 2.5 mm in thickness. Each of the sheets was laminated with one and the plain cloth as above dipped after which a rubber-fiber structure was provided.

Figure 1:
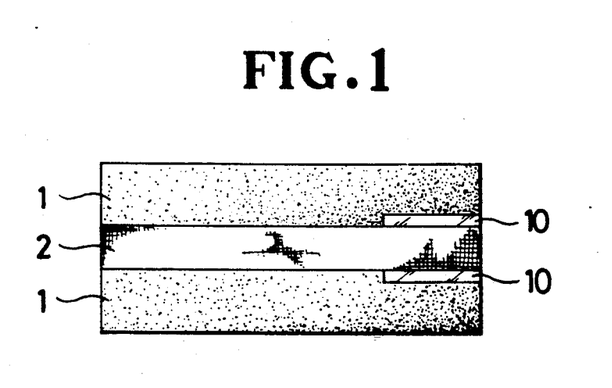
FIG. 1 is a front elevational view of a composite laminate embodying the present invention.

A plain cloth 2 of 15cm×10cm was interposed between two rubbery layers 1, 1 of 15cm×10cm×2.5mm as seen from FIG. 1. Cellophanes 10 were interlaced for attachment to a gripper and also for peeling with simplicity. The resulting laminate was press-cured into an integral structure on a laboratory press at a surface pressure of 30 kgf/cm² and at 153° C. for 90 minutes. On disposition at room temperature for 24 hours the cured laminate was cut to a width of 2.54 cm after which a test sample was obtained. Peel strength was examined with the results in Table 4.

Measurement was made on a tensile tester at a speed of 50 mm/min as stipulated in JIS K-6301. Greater than 4 kgf/25 mm are graded as acceptably resistant to peeling. In Table 4 the symbol "o" denotes material fracture upon naked inspect in and "x" interfacial peel.

GROUP II: EXAMPLES 4-7 AND COMPARATIVE EXAMPLES 3-6

The procedure of Example 1 was followed except for the use of the rubber mixes and dipped fibers shown in Table 5 together with the results obtained.

GROUP III: EXAMPLES 8-14 AND COMPARATIVE EXAMPLES 7-12

Figure 2:
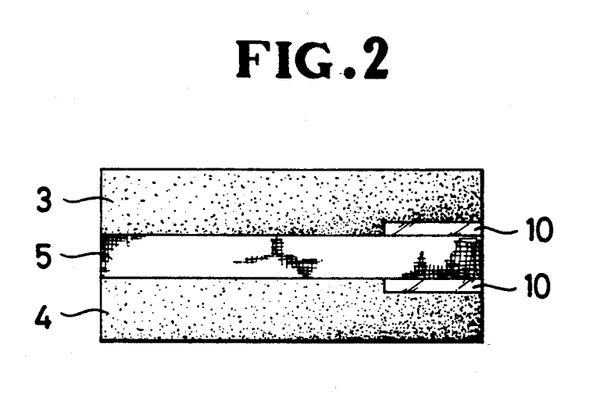
FIGS. 2 and 3 are views similar to FIG. 1 but illustrative of modified forms of the laminate.

The procedure of Example 1 was followed except that the rubber mixes and dipped fibers of Tables 6-1 to 6-3 were used and that a test sample was structured as illustrated in FIG. 2 in which a plain cloth 5 of 15cm×10cm was held in interposed relation to two different rubbery layers 3, 4 of 5cm×10cm×2.5mm and with cellophanes 10 interlaminated, thereby providing a rubber-fiber-rubber structure.

In these examples bondability was further evaluated by testing the peel strength and appearance between the layer 3 and the cloth 5 and between the layer 4 and the cloth 5. The results obtained are shown in Tables 6-1 to 6-3.

GROUP IV: EXAMPLES 15-24 COMPARATIVE EXAMPLES 13-20

Figure 3:
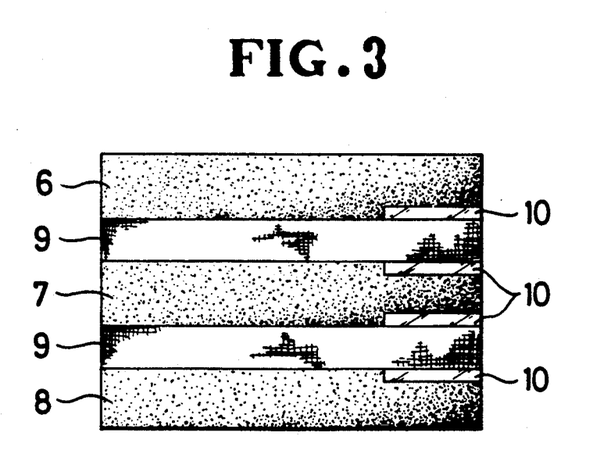

The procedure of Example 1 was followed except that a test sample was formed in a rubber-fiber-rubber-fiber-rubber structure, as shown in FIG. 3, with the use of the rubber mixes and plain clothes of Tables 7-1 to 7-4. Clothes 9, 9 of 15cm×10cm were disposed respectively between the layers 6 and 7 and between the layers 7 and 8 with cellophanes 10, 10 interlaminated, each rubber layer being dimensioned to be 15cm×10cm×2.5mm.

As were in Examples 1 and 8 peel strength, appearance and adhesiveness were determined with the results given in Tables 7-1 to 7-4.

GROUP V: EXAMPLES 25-27 AND COMPARATIVE EXAMPLES 21-23

Figure 4:
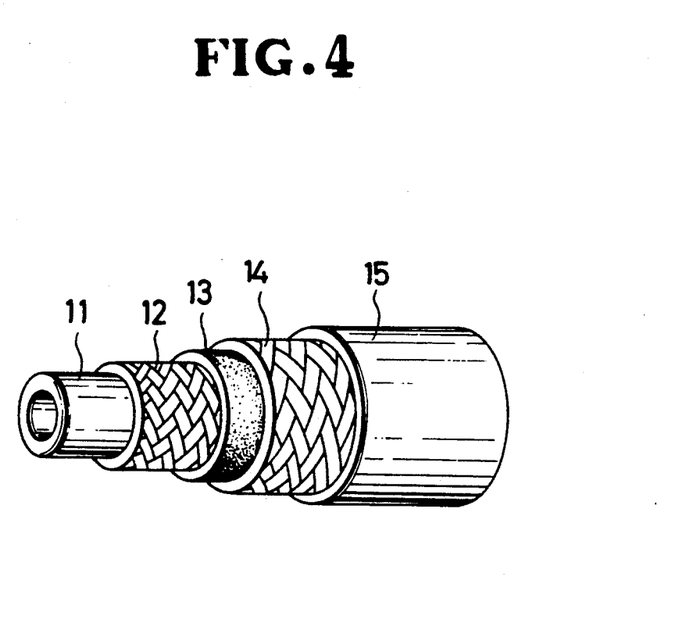
FIG. 4 is a segmental perspective view of a composite hose constructed in accordance with the invention.

Different composite hoses were produced as formulated in Table 8 and illustrated in FIG. 4.

An inner tube 11 was formed by extruding a given rubber mix onto a mandrel to an inside diameter of 9.5mm and also to a thickness of 1.6mm. Dipped fiber of nylon-66 was braided over the inner tube to thereby form a first reinforcement 12 on which was disposed as an intermediate layer 13 a rubber sheet obtained at a thickness of 0.3mm on a laboratory roll, and a similar reinforcement 14 was then braided. Subsequently, a cover 15 was disposed peripherally over the second reinforcement by extrusion of a selected rubber mix to an outside diameter of 19.0mm.

The hose thus assembled, after being covered with a nylon wrapper, was steam-vulcanized at 160oC for 90 minutes after which the wrapper was uncovered and the mandrel pulled out. Performance evaluation was made of the resulting test hose particularly in regard to durability at high temperature under the conditions given below and with the results shown in Table 8.

Rupture pressure was measured in accordance with JIS K-6349 7.3(3). Pressures of larger than 580 kgf/cm$^2$ are preferable.

Volume expansion was examined by a SAE J188 procedure. This quality is acceptable in the range of 6 to 8 cc/ft.

Bending strength at low temperature was adjudged by immersing the hose in a temperature-constant vessel at $-40°$ C., followed by standing for 24 hours, and subsequently by bending the hose at a curvature of 80mm. Failures such as break and peel were inspected.

Impact resistance was determined as stipulated in SAE J118, Type I both at 140° C. and at 160° C. Acceptable cycles of durability are not less than 250×10$^4$ at 140° C. and more than 70×10$^4$ at 160° C.

GROUP VI: EXAMPLES 28-31 AND COMPARATIVE EXAMPLES 24-25

The procedure of Example 25 was followed except that a test hose was produced as formulated in Table 9. The results obtained are shown in the same table.

GROUP VII: EXAMPLE 32

The procedure of Example 25 was followed except for the use of the formulation of Table 10.

Group I is taken to evaluate the effect of MgO contents in rubber mix A upon rubber-fiber adhesion. As is apparent from Examples 1-3 the larger content of MgO, the greater the adhesion is with material fracture. Omission of MgO invited insufficient adhesiveness, leading to interfacial peel, as evidenced by Comparative Examples 1 and 2.

Group II demonstrates the effect of dip compositions upon rubber-fiber adhesion. Departures of resorcinol to formalin ratios from the specified range, Comperative Examples 3-6, revealed inadequate bonding and hence interfacial peel.

Group III is directed to a rubber-fiber-rubber laminate. Examples 8-14 have been found satisfactory in respect of all the properties tested. Comparative Examples 7 and 8 in which MgO was absent in rubber mix A and Comparative Examples 9-12 in which the dip coatings were outside the scope of the specified composition were inadequate in bonding and impossible of dipping.

Group IV shows a rubber-fiber-rubber-fiber-rubber structure. Freedom of MgO from rubber mix A, Comparative Examples 13 -16, failed to improve bonding. Gelation took place in dip coatings departing from the specified composition as appears clear from Comparative Examples 17-20.

Group V is concerned with a hose constructed with an inner tube of rubber mix A, an intermediate layer of rubber mix B, a cover of rubber mix B and two reinforcements of fibrous material dipped according to the invention. The effect of MgO in rubber mix A has been examined on the hose performance. Controls devoid of MgO, Comparative Examples 21-23, were inadequate in impact resistance and hence bonding capability at high temperature although they are acceptable in rupture pressure, volume expansion and bending strength at low temperature. The specified contents of MgO are highly effective in improving impact resistance with a level of other properties comparable to the controls as is evident from Examples 25-27. The inventive hose has been proved sufficiently durable even at 160° C.

Group VI tests the criticality of dip coatings for application to the reinforcements. The inventive hose, Examples 27-31, are notably resistant to impact at high temperature with other qualities comparable to those in Comparative Examples 24-27 in which the latex-resorcinolformalin ratios were outside the specified range.

Group VII represents a hose consisting of an inner tube of rubber mix A, an intermediate layer of rubber mix B or C, a cover of rubber mix B and two inventive reinforcements. The data resulting from Example 32 shows that a hose having an intermediate layer of NBR excels not only in impact resistance at high temperature even at 160° C. but also in rupture pressure, volume expansion and bending strength at low temperature as does in Example 27 using a similar layer of CSM.

Various changes and modifications may be made in the above described embodiments as conceived by those skilled in the art within the scope of the appended claims.

TABLE 1

| rubber mix | A-1 | A-2 | A-3 | A-4 | A-5 | A-6 |
|---|---|---|---|---|---|---|
| polymer 1 (HSN) ACN: 33 wt. % C=C: 1.3 wt. % C—C: 65.7 wt. % | — | 100 | 100 | 100 | 100 | 100 |
| polymer 2 (HSN) ACN: 33 wt. % C=C: 6.7 wt. % C—C: 60.3 wt. % | 100 | — | — | — | — | — |
| SFR Asahi No. 50 | 95 | 95 | 95 | 95 | 95 | 95 |
| MgO | — | — | — | 2 | 5 | 10 |
| ZnO | 5 | 5 | 2 | 2 | 2 | 2 |
| stearic acid | 1 | 1 | 1 | 1 | 1 | 1 |
| Vulkanox DDA | 1.5 | 1.5 | 1.5 | 1.5 | 1.5 | 1.5 |
| Vulkanox ZMB-2 | 1.5 | 1.5 | 1.5 | 1.5 | 1.5 | 1.5 |
| WAX PE 520 | 1 | 1 | 1 | 1 | 1 | 1 |
| TAIC | — | — | 2 | 2 | 2 | 2 |
| Witamol 218 | 7 | 7 | 7 | 7 | 7 | 7 |
| Actor MS-R | 2 | 2 | — | — | — | — |
| Sunceller TT | 2 | 2 | — | — | — | — |
| Sunceller M | 0.5 | 0.5 | — | — | — | — |
| Parkerdox 14/40 | — | — | 7.5 | 7.5 | 7.5 | 7.5 |

TABLE 2-1

| rubber mix | B-1 |
|---|---|
| Hyperlon 40 (CSM) | 100 |
| SRF Asahi No. 50 | 80 |
| AC polyethylene | 3 |
| MgO | 5 |
| Nocrac NBC | 1 |
| DOP | 20 |
| litharge Yellow No. 1 | 5 |
| Sunceller TRA | 1.5 |

TABLE 2-2

| rubber mix | C-1 |
|---|---|
| Nipol 1042 (NBR) | 100 |
| SRF Asahi No. 50 | 60 |
| Nipseal AQ | 20 |
| ZnO | 5 |
| stearic acid | 1 |
| resorcinol | 3 |
| ZINSNET F | 2 |
| DOP | 20 |
| sulfur | 2 |
| Nocceller MSA-G | 1 |
| Nocceller H | 2 |

TABLE 3

| dip coating | D-1 | D-2 | D-3 | D-4 | D-5 | D-6 | D-7 | D-8 | D-9 |
|---|---|---|---|---|---|---|---|---|---|
| latex (L) | ←Nipol 1571→ | | | | | | | | |
| resorcinol (R)/formalin (F) (mol ratio) | 10/3 | 5/3 | 5/4 | 1/1 | 5/8 | 5/4 | 5/4 | 5/4 | 5/4 |
| R + F/L (wt ratio) | 50/100 | 50/100 | 50/100 | 50/100 | 50/100 | 20/100 | 35/100 | 65/100 | 80/100 |

Notes to Tables 1, 2-1, 2-2 and 3

| material | maker | chemical nature |
|---|---|---|
| SRF Asahi No. 50 | Asahi Carbon | SRF carbon black |
| Vulkanox DDA | Byer | diphenylamine derivative |
| Vulkanox ZMB-2 | Byer | 4,5-methylmercaptobenzimidazole zinc salt |
| WAX PE 520 | Hoechst | wax |
| TAIC | Nippon Kasei | triallyl isocyanate |
| Witamol 218 | Dynamit Nobel | trimellitate ester |
| Actor MS-R | Kawaguchi Chemical | 4,4'-dithiodimorpholine |
| Sunceller TT | Sunshin Chemical | tetramethylthiuram disulfide |
| Sunceller M | Sunshin Chemical | 2-mercaptobenzothiazole |
| Parkerdox 14/40 | Kayaku Nulley | 1,3-bis(t-butylperoxyisopropyl)benzene (content: 40 wt %) |
| Hyperlon 40 | Dupont | chlorosulfonated polyethylene |
| Nocrac NBC | Ohuchi Shinko Kagaku | nickel dibutyldithiocarbamate |
| DOP | Chisso Petrochemical | 2-ethylhexyl phthalate |
| Sunceller TRA | Sanshin Kagaku | dipentamethylenethiuram tetrasulfide |

-continued

Notes to Tables 1, 2-1, 2-2 and 3

| material | maker | chemical nature |
|---|---|---|
| Nipol 1042 | Nippon Zeon | acrylonitrile-butadiene rubber |
| Nipseal AQ | Nippon Silica | silicon dioxide |
| resorcinol | Sumitomo Chemical | resorcinol |
| ZISNET F | Sankyo Kasei | 2,4,6-trimercapto-1,3,5-triazine |
| Nocceller MSA-G | Ohuchi Shinko Kagaku | N-cyclohexyl-2-benzothiazyl sulfeneamide |
| Nocceller H | Ohuchi Shinko Kagaku | hexamethylenetetraamine |
| Nipol 1571 | Nippon Zeon | carboxyl-modified acrylonitrile-butadiene rubber latex (solid content: 40%) |

TABLE 4

| run | Comparative Examples 1 | Comparative Examples 2 | Examples 1 | Examples 2 | Examples 3 |
|---|---|---|---|---|---|
| rubber layer 1 | A-2 (HSN) | A-3 (HSN) | A-4 (HSN) | A-5 (HSN) | A-6 (HSN) |
| peroxide curing agent | − | + | + | + | + |
| MgO | − | − | 2 | 5 | 10 |
| dip coating for cloth 2 | D-3 | D-3 | D-3 | D-3 | D-3 |
| peel strength (kgf/25 mm) | 1.7 | 2.5 | 4.5 | 6.5 | 8.0 |
| appearance | x | x | ○ | ○ | ○ |

+: added
−: not added

TABLE 5

| run | Comparative Example 3 | Examples 4 | Examples 3 | Examples 5 | Comparative Example 4 |
|---|---|---|---|---|---|
| rubber layer 1 | A-6 (HSN) | A-6 (HSN) | A-6 (HSN) | A-6 (HSN) | A-6 (HZN) |
| peroxide curing agent | + | + | + | + | + |
| MgO | 10 | 10 | 10 | 10 | 10 |
| dip coating for cloth 2 | D-1 | D-2 | D-3 | D-4 | D-5 |
| peel strength (kgf/25 mm) | 2.8 | 4.8 | 8.0 | 7.3 | * |
| appearance | x | ○ | ○ | ○ | * |

| run | Comparative Example 5 | Examples 6 | Examples 3 | Examples 7 | Comparative Example 6 |
|---|---|---|---|---|---|
| rubber layer 1 | A-6 (HSN) | A-6 (HSN) | A-6 (HSN) | A-6 (HSN) | A-6 (HZN) |
| peroxide curing agent | + | + | + | + | + |
| MgO | 10 | 10 | 10 | 10 | 10 |
| dip coating for cloth 2 | D-6 | D-7 | D-3 | D-8 | D-9 |
| peel strength (kgf/25 mm) | 2.4 | 5.0 | 8.0 | 8.4 | * |
| appearance | x | ○ | ○ | ○ | * |

*impossible of determination due to gelation of dip coating
+,−: same as in footnote to Table 4

TABLE 6-1

| run | Comparative Examples 7 | Comparative Examples 8 | Examples 8 | Examples 9 | Examples 10 |
|---|---|---|---|---|---|
| rubber layer 3 | A-2 | A-3 | A-4 | A-5 | A-6 |
| | (HSN) | (HSN) | (HSN) | (HSN) | (HSN) |
| peroxide curing agent | − | + | + | + | + |
| MgO | − | − | 2 | 5 | 10 |
| dip coating for cloth 5 | D-3 | D-3 | D-3 | D-3 | D-3 |
| rubber layer 4 | B-1 (CSM) | B-1 (CSM) | B-1 (CSM) | B-1 (CSM) | B-1 (CSM) |
| layer 3 - cloth 5 peeling | | | | | |
| peel strength (kgf/25 mm) | 1.7 | 2.5 | 4.5 | 6.5 | 8.0 |
| appearance | x | x | ○ | ○ | ○ |
| layer 4 - cloth 5 peeling | | | | | |
| peel strength (kgf/25 mm) | 9.2 | 9.2 | 9.2 | 9.2 | 9.2 |
| appearance | ○ | ○ | ○ | ○ | ○ |
| adhesion | x | x | ○ | ○ | ○ |

TABLE 6-2

| run | Comparative Example 9 | Examples 11 | Examples 10 | Examples 12 | Comparative Example 10 |
|---|---|---|---|---|---|
| rubber layer 3 | A-6 (HSN) | A-6 (HSN) | A-6 (HSN) | A-6 (HSN) | A-6 (HSN) |
| peroxide curing agent | + | + | + | + | + |
| MgO | 10 | 10 | 10 | 10 | 10 |
| dip coating for cloth 5 | D-1 | D-2 | D-3 | D-4 | D-5 |
| rubber layer 4 | B-1 (CSM) | B-1 (CSM) | B-1 (CSM) | B-1 (CSM) | B-1 (CSM) |
| layer 3 - cloth 5 peeling | | | | | |
| peel strength (kgf/25 mm) | 2.8 | 4.8 | 8.0 | 7.3 | * |
| appearance | x | ○ | ○ | ○ | * |
| layer 4 - cloth 5 peeling | | | | | |
| peel strength (kgf/25 mm) | 2.8 | 8.5 | 9.2 | 8.0 | * |
| appearance | x | ○ | ○ | ○ | * |

TABLE 6-2-continued

| run | Comparative Example 9 | Examples 11 | 10 | 12 | Comparative Example 10 |
|---|---|---|---|---|---|
| adhesion | x | o | o | o | x |

*same as in footnote to Table 5

TABLE 6-3

| run | Comparative Example 11 | Examples 13 | 10 | 14 | Comparative Example 12 |
|---|---|---|---|---|---|
| rubber layer 3 | A-6 (HSN) | A-6 (HSN) | A-6 (HSN) | A-6 (HSN) | A-6 (HSN) |
| peroxide curing agent | + | + | + | + | + |
| MgO | 10 | 10 | 10 | 10 | 10 |
| dip coating for cloth 5 | D-6 | D-7 | D-3 | D-8 | D-9 |
| rubber layer 4 | B-1 (CSM) | B-1 (CSM) | B-1 (CSM) | B-1 (CSM) | B-1 (CSM) |
| layer 3 - cloth 5 peeling | | | | | |
| peel strength (kgf/25 mm) | 2.4 | 5.0 | 8.0 | 8.4 | * |
| appearance | x | o | o | o | * |
| layer 4 - cloth 5 peeling | | | | | |
| peel strength (kgf/25 mm) | 2.5 | 6.5 | 9.2 | 9.3 | * |
| appearance | x | o | o | o | * |
| adhesion | x | o | o | o | x |

TABLE 7-1

| run | Comparative Examples 13 | 14 | Examples 15 | 16 | 17 |
|---|---|---|---|---|---|
| rubber layer 6 | A-2 (HSN) | A-3 (HSN) | A-4 (HSN) | A-5 (HSN) | A-6 (HSN) |
| peroxide curing agent | − | + | + | + | + |
| MgO | − | − | 2 | 5 | 10 |
| dip coating for cloth 9 | D-3 | D-3 | D-3 | D-3 | D-3 |
| rubber layer 7 | C-1 (NBR) | C-1 (NBR) | C-1 (NBR) | C-1 (NBR) | C-1 (NBR) |
| dip coating for cloth 9 | D-3 | D-3 | D-3 | D-3 | D-3 |
| rubber layer 8 | B-1 (CSM) | B-1 (CSM) | B-1 (CSM) | B-1 (CSM) | B-1 (CSM) |
| layer 6 - cloth 9 peeling | | | | | |
| peel strength (kgf/25 mm) | 1.7 | 2.5 | 4.5 | 6.5 | 8.0 |
| appearance | x | x | o | o | o |
| layer 7 - cloth 9 peeling | | | | | |
| peel strength (kgf/25 mm) | 10.5 | 10.5 | 10.5 | 10.5 | 10.5 |
| appearance | o | o | o | o | o |
| layer 8 - cloth 9 peeling | | | | | |
| peel strength (kgf/25 mm) | 9.2 | 9.2 | 9.2 | 9.2 | 9.2 |
| appearance | o | o | o | o | o |
| adhesion | x | x | o | o | o |

TABLE 7-2

| run | Comparative Examples 15 | 16 | Examples 18 | 19 | 20 |
|---|---|---|---|---|---|
| rubber layer 6 | A-2 (HSN) | A-3 (HSN) | A-4 (HSN) | A-5 (HSN) | A-6 (HSN) |
| peroxide curing agent | − | + | + | + | + |
| MgO | − | − | 2 | 5 | 10 |
| dip coating for cloth 9 | D-3 | D-3 | D-3 | D-3 | D-3 |
| rubber layer 7 | B-1 (CSM) | B-1 (CSM) | B-1 (CSM) | B-1 (CSM) | B-1 (CSM) |
| dip coating for cloth 9 | D-3 | D-3 | D-3 | D-3 | D-3 |
| rubber layer 8 | B-1 (CSM) | B-1 (CSM) | B-1 (CSM) | B-1 (CSM) | B-1 (CSM) |
| layer 6 - cloth 9 peeling | | | | | |
| peel strength (kgf/25 mm) | 1.7 | 2.5 | 4.5 | 6.5 | 8.0 |
| appearance | x | x | o | o | o |
| layer 7 - cloth 9 peeling | | | | | |
| peel strength (kgf/25 mm) | 9.2 | 9.2 | 9.2 | 9.2 | 9.2 |
| appearance | o | o | o | o | o |
| layer 8 - cloth 9 peeling | | | | | |
| peel strength (kgf/25 mm) | 9.2 | 9.2 | 9.2 | 9.2 | 9.2 |
| appearance | o | o | o | o | o |
| adhesion | x | x | o | o | o |

TABLE 7-3

| run | Comparative Example 17 | Examples 21 | 20 | 22 | Comparative Example 18 |
|---|---|---|---|---|---|
| rubber layer 6 | A-6 (HSN) | A-6 (HSN) | A-6 (HSN) | A-6 (HSN) | A-6 (HSN) |
| peroxide curing agent | + | + | + | + | + |
| MgO | 10 | 10 | 10 | 10 | 10 |
| dip coating for cloth 9 | D-1 | D-2 | D-3 | D-4 | D-5 |
| rubber layer 7 | B-1 (CSM) | B-1 (CSM) | B-1 (CSM) | B-1 (CSM) | B-1 (CSM) |
| dip coating for cloth 9 | D-1 | D-2 | D-3 | D-4 | D-5 |
| rubber layer 8 | B-1 (CSM) | B-1 (CSM) | B-1 (CSM) | B-1 (CSM) | B-1 (CSM) |
| layer 6 - cloth 9 peeling | | | | | |
| peel strength (kgf/25 mm) | 2.8 | 4.8 | 8.0 | 7.3 | * |
| appearance | x | o | o | o | * |
| layer 7 - cloth 9 peeling | | | | | |
| peel strength (kgf/25 mm) | 2.8 | 8.5 | 9.2 | 8.0 | * |

TABLE 7-3-continued

| run | Comparative Example 17 | Examples 21 | 20 | 22 | Comparative Example 18 |
|---|---|---|---|---|---|
| appearance | x | o | o | o | * |
| layer 8 - cloth 9 peeling | | | | | |
| peel strength (kgf/25 mm) | 2.8 | 8.5 | 9.2 | 8.0 | * |
| appearance | x | o | o | o | * |
| adhesion | x | o | o | o | x |

TABLE 7-4

| run | Comparative Example 19 | Examples 23 | 20 | 24 | Comparative Example 20 |
|---|---|---|---|---|---|
| rubber layer 6 | A-6 (HSN) | A-6 (HSN) | A-6 (HSN) | A-6 (HSN) | A-6 (HSN) |
| peroxide curing agent | + | + | + | + | + |
| MgO | 10 | 10 | 10 | 10 | 10 |
| dip coating for cloth 9 | D-6 | D-7 | D-3 | D-8 | D-9 |
| rubber layer 7 | B-1 (CSM) | B-1 (CSM) | B-1 (CSM) | B-1 (CSM) | B-1 (CSM) |
| dip coating for cloth 9 | D-6 | D-7 | D-3 | D-8 | D-9 |
| rubber layer 8 | B-1 (CSM) | B-1 (CSM) | B-1 (CSM) | B-1 (CSM) | B-1 (CSM) |
| layer 6 - cloth 9 peeling | | | | | |
| peel strength (kgf/25 mm) | 2.4 | 5.0 | 8.0 | 8.4 | * |
| appearance | x | o | o | o | * |
| layer 7 - cloth 9 peeling | | | | | |
| peel strength (kgf/25 mm) | 2.5 | 6.5 | 9.2 | 9.3 | * |
| appearance | x | o | o | o | * |
| layer 8 - cloth 9 peeling | | | | | |
| peel strength (kgf/25 mm) | 2.5 | 6.5 | 9.2 | 9.3 | * |
| appearance | x | o | o | o | * |
| adhesion | x | o | o | o | x |

TABLE 8

| run | Comparative Examples 21 | 22 | 23 | Examples 25 | 26 | 27 |
|---|---|---|---|---|---|---|
| inner tube rubber | A-1 (HSN) | A-2 (HSN) | A-3 (HSN) | A-4 (HSN) | A-5 (HSN) | A-6 (HSN) |
| peroxide curing agent | − | − | + | + | + | + |
| MgO | − | − | − | 2 | 5 | 10 |
| dip coating for 1st reinforcement | D-3 | D-3 | D-3 | D-3 | D-3 | D-3 |
| intermediate layer rubber | B-1 (CSM) | B-1 (CSM) | B-1 (CSM) | B-1 (CSM) | B-1 (CSM) | B-1 (CSM) |
| dip coating for 2nd reinforcement | D-3 | D-3 | D-3 | D-3 | D-3 | D-3 |
| cover rubber | B-1 (CSM) | B-1 (CSM) | B-1 (CSM) | B-1 (CSM) | B-1 (CSM) | B-1 (CSM) |
| rupture pressure (kgf/cm$^2$) | 590–620 | 580–600 | 600–620 | 590–610 | 600–620 | 600–620 |
| volume expansion (cc/ft at 91 kgf/cm$^2$) | 6–8 | 7–8 | 6–8 | 6–8 | 6–7 | 6–8 |
| bending strength (−40° C.) | o | o | o | o | o | o |
| impact resistance (cycle × 10$^4$) | | | | | | |
| 140° C. | 60–80 | 60–90 | 60–80 | 300–350 | 320–350 | 300–350 |
| 160° C. | 10–30 | 10–30 | 20–40 | 100–120 | 100–120 | 100–120 | o: acceptable

TABLE 9

| run | Comparative Example 24 | Example 28 | 27 | 29 | Comparative Example 25 | Examples 30 | 27 | 31 |
|---|---|---|---|---|---|---|---|---|
| inner tube rubber | A-6 (HSN) | A-6 (HSN) | A-6 (HSN) | A-6 (HSN) | A-6 (HSN) | A-6 (HSN) | A-6 (HSN) | A-6 (HSN) |
| peroxide curing agent | + | + | + | + | + | + | + | + |
| MgO | 10 | 10 | 10 | 10 | 10 | 10 | 10 | 10 |
| dip coating for 1st reinforcement | D-1 | D-2 | D-3 | D-4 | D-6 | D-7 | D-3 | D-8 |
| intermediate layer rubber | B-1 (CSM) | B-1 (CSM) | B-1 (CSM) | B-1 (CSM) | B-1 (CSM) | B-1 (CSM) | B-1 (CSM) | B-1 (CSM) |
| dip coating for 2nd reinforcement | D-1 | D-2 | D-3 | D-4 | D-6 | D-7 | D-3 | D-8 |

TABLE 9-continued

| run | Comparative Example 24 | Example 28 | 27 | 29 | Comparative Example 25 | Examples 30 | 27 | 31 |
| --- | --- | --- | --- | --- | --- | --- | --- | --- |
| cover rubber | B-1 (CSM) | B-1 (CSM) | B-1 (CSM) | B-1 (CSM) | B-1 (CSM) | B-1 (CSM) | B-1 (CSM) | B-1 (CSM) |
| rupture pressure (kgf/cm$^2$) | 590–610 | 590–620 | 600–620 | 600–620 | 580–610 | 590–610 | 600–620 | 600–620 |
| volume expansion (cc/ft at 91 kgf/cm$^2$) | 7–8 | 6–8 | 6–8 | 6–7 | 7–8 | 6–8 | 6–8 | 6–8 |
| bending strength (−40° C.) | o | o | o | o | o | o | o | o |
| impact resistance (cycle × 10$^4$) | | | | | | | | |
| 140° C. | 50–80 | 300–320 | 300–350 | 300–350 | 50–90 | 280–300 | 300–350 | 300–350 |
| 160° C. | 10–30 | 90–120 | 100–120 | 100–120 | 20–30 | 80–120 | 100–120 | 100–120 |

TABLE 10

| run | Examples 32 | 27 |
| --- | --- | --- |
| inner tube rubber | A-6 (HSN) | A-6 (HSN) |
| peroxide curing agent | + | + |
| MgO | 10 | 10 |
| dip coating for 1st reinforcement | D-3 | D-3 |
| intermediate layer rubber | C-1 (NBR) | B-1 (CSM) |
| dip coating for 2nd reinforcement | D-3 | D-3 |
| cover rubber | B-1 (CSM) | B-1 (CSM) |
| rupture pressure (kgf/cm$^2$) | 600–620 | 600–620 |
| volume expansion (cc/ft at 91 kgf/cm$^2$) | 6–8 | 6–8 |
| bending strength (−40° C.) | o | o |
| impact resistance (cycle × 10$^4$) | | |
| 140° C. | 300–330 | 300–350 |
| 160° C. | 100–120 | 100–120 |

What is claimed is:

1. A composite laminate comprising:
   (a) a rubbery layer formed from a rubber composition comprising 100 parts by weight of a copolymeric rubber having in the molecular chain an unsaturated nitrile unit in an amount of 10 to 45 percent by weight, a conjugated diene unit in an amount up to 5 percent by weight and either one or both of an ethylenically unsaturated unit other than said unsaturated nitrile unit and a hydrogenated conjugated diene unit in an amount of 50 to 90 percent by weight, 0.2 to 15 parts by weight of an organic peroxide curing agent and 1 to 20 parts by weight of magnesium oxide; and
   (b) a fibrous layer formed from an organic fiber and disposed adhesively over said rubbery layer, said fiber having previously been treated with a dip coating consisting essentially of 100 parts by weight of at least one latex of acrylonitrile-butadiene rubber and a carboxyl modified rubber thereof and 30 to 70 parts by weight of a precondensate of resorcinol and formalin in a mol ratio of 5:3 to 1:1.

2. The laminate of claim 1 further including a second rubbery layer formed of a chlorosulfonated polyethylene rubber composition and bonded over said fibrous layer.

3. The laminate of claim 2 further including a second fibrous layer and a third rubbery layer bonded in that order over said second rubbery layer, said second fibrous layer being treated with said dipping coating, said third rubbery layer being formed from (1) a rubber composition made up of 100 parts by weight of a sulfur-vulcanizable rubber, 0.1 to 15 parts by weight of an organic sulfur-containing compound, a silica, a resorcinol donor and a methylene donor, (2) a chlorsulfonated polyethylene rubber composition or a blend of (1) and (2).

4. The laminate of claim 1 wherein said copolymeric rubber is one hydrogenated member selected from the group consisting of acrylonitrile-butadiene rubber, acrylonitrile-isoprene rubber, acrylonitrile-butadiene-isoprene rubber, acrylonitrile-butadiene-methyl acrylate rubber, acrylonitrile-butadiene-acrylate rubber, acrylonitrile-ethylene-butadiene rubber, acrylonitrile-butyl acrylate-ethoxyethyl acrylate-vinyl chloroacetate rubber, acrylonitrile-butyl acrylate-ethoxyethyl acrylate-vinyl norbornene rubber and blends thereof.

5. The laminate of claim 1 wherein said peroxide curing agent is selected from the group consisting of dicumyl peroxide, 1,2-bis(t-butylperoxyisopropyl)benzene and n-butyl 4,4-di-t-butylperoxy valerianic acid.

6. The laminate of claim 1 wherein said organic fiber is selected from the group consisting of nylon, polyester, rayon, cotton, vinylon and aramid.

7. The laminate of claim 3 wherein said sulfur-vulcanizable rubber is selected from the group consisting of natural rubber, polyisoprene rubber, styrene-butadiene rubber and acrylonitrile-butadiene rubber.

8. The laminate of claim 3 wherein said sulfur-containing compound is represented by the formula 6-R-2,4-dimercapto-1,3,5-triazine where R is a mercapto, alkoxy, mono- or di-alkylamino, mono- or di-cycloalkylamino, mono- or di-arylamino or N-alkyl-N'-arylamine group.

9. The laminate of claim 8 wherein said sulfur-containing compound is 2,4,6-trimercapto-1,3,5-triazine.

10. The laminate of claim 3 wherein said resorcinol donor is resorcinol or a condensate of resorcinol and formalin.

11. The laminate of claim 3 wherein said methylene donor is hexamethylenetetraamine.

12. A composite hose comprising:
   (a) an inner tube formed from a rubber composition comprising 100 parts by weight of a copolymeric rubber having in the molecular chain an unsaturated nitrile unit in an amount of 10 to 45 percent by weight, a conjugated diene unit in an amount up to 5 percent by weight and either one or both of an ethylenically unsaturated nitrile unit and a hydrogenated conjugated diene unit in an amount of 50 to 90 percent by weight, 0.2 to 15 parts by weight of an organic peroxide curing agent and 1 to 20 parts by weight of magnesium oxide;

(b) a reinforcing layer formed from an organic fiber and bonded over said inner tube, said fiber having previously been treated with a dip coating consisting essentially of 100 parts by weight of at least one latex of acrylonitrile-butadiene rubber and a carboxyl-modified rubber thereof and 30 to 70 parts by weight of a precondensate of resorcinol and formalin in a mol ratio of 5:3 to 1:1; and (c) a cover laminated around said reinforcing layer.

13. The hose of claim 12 wherein said cover is formed from a chlorosulfonated polyethylene rubber composition.

14. The hose of claim 12 further including an intermediate rubbery layer and a second reinforcing layer interposed respectively between the first mentioned reinforcing layer and the cover, said intermediate rubbery layer being formed from either one of a rubber composition made up of 100 parts by weight of a sulfur-vulcanizable rubber, 0.1 to 15 parts by weight of an organic sulfur-containing compound, a silica, a resorcinol donor and a methylene donor, a chlorosulfonated polyethylene rubber composition and a blend thereof, said second reinforcing layer being formed from an organic fiber treated with said dip coating.

* * * * *